United States Patent [19]

Wade

[11] Patent Number: 4,600,081
[45] Date of Patent: Jul. 15, 1986

[54] PORTABLE TREE SEAT FOR HUNTERS AND OUTDOORSMEN

[76] Inventor: Richard J. Wade, 5677 Hempline, St. Louis, Mo. 63129

[21] Appl. No.: 723,541

[22] Filed: Apr. 15, 1985

[51] Int. Cl.$^4$ .................. A01M 31/02; A45F 3/26; A47C 9/10
[52] U.S. Cl. ................................... 182/187; 108/152; 182/92
[58] Field of Search ............... 182/187, 188, 120, 121, 182/122, 92; 108/152

[56] References Cited

U.S. PATENT DOCUMENTS

| | | | |
|---|---|---|---|
| 221,780 | 11/1879 | Clark | 182/121 |
| 2,855,980 | 10/1958 | Konieczka | 182/187 |
| 2,991,842 | 7/1961 | Hardin | 182/187 |
| 3,294,197 | 12/1966 | Kwiatkowski | 182/120 |
| 3,353,629 | 11/1967 | Bruner | 182/187 |
| 3,368,725 | 2/1968 | Martin | 182/187 |
| 3,392,802 | 7/1968 | Moore | 182/187 |
| 3,493,080 | 2/1970 | Ehlert | 182/187 |
| 3,767,011 | 10/1973 | Witt | 182/187 |
| 4,109,761 | 8/1978 | Matlock | 182/92 |
| 4,113,057 | 9/1978 | Bessinger | 182/187 |
| 4,113,058 | 9/1978 | Kobosh | 182/187 |

*Primary Examiner*—Reinaldo P. Machado

[57] ABSTRACT

An improved portable tree seat for hunters and outdoorsmen comprising two symetrical and substantially triangular tree engaging support members whose frontal or vertical face protrusions engage the tree at four distinct locations, and whose rearward horizontal top edges support and interconnect with the seat which in conjunction with two lateral interconnecting members, provide separation and permanent attachment of two tree engaging support members. The entire seat device is held tightly against the tree and locked thereunto by a steel chain which can be adjusted to varying tree diameters by selection of the appropriate link. One end of the chain is permanently affixed to the upper exterior face of one tree engaging support members by means of a free wheeling steel eyelet bolt and with the chain encircling the tree, is then selectively secured to the opposing tree engaging support member's upper exterior face by means of a free wheeling swivel hook. The seat device is initially positioned to the tree in a vertical orientation and with the chain attached is then forced downward into a locked horizontal attitude to the tree. In this position, the invention may be utilized by itself as a tree seat, or as a seat used in combination with stationary tree platforms or climbing tree platforms, or as an aid-assit to tree climbing platforms. It may also be used as a horizontal support for heavy loads or as a platform to support a camping stove or latern etc.

3 Claims, 4 Drawing Figures

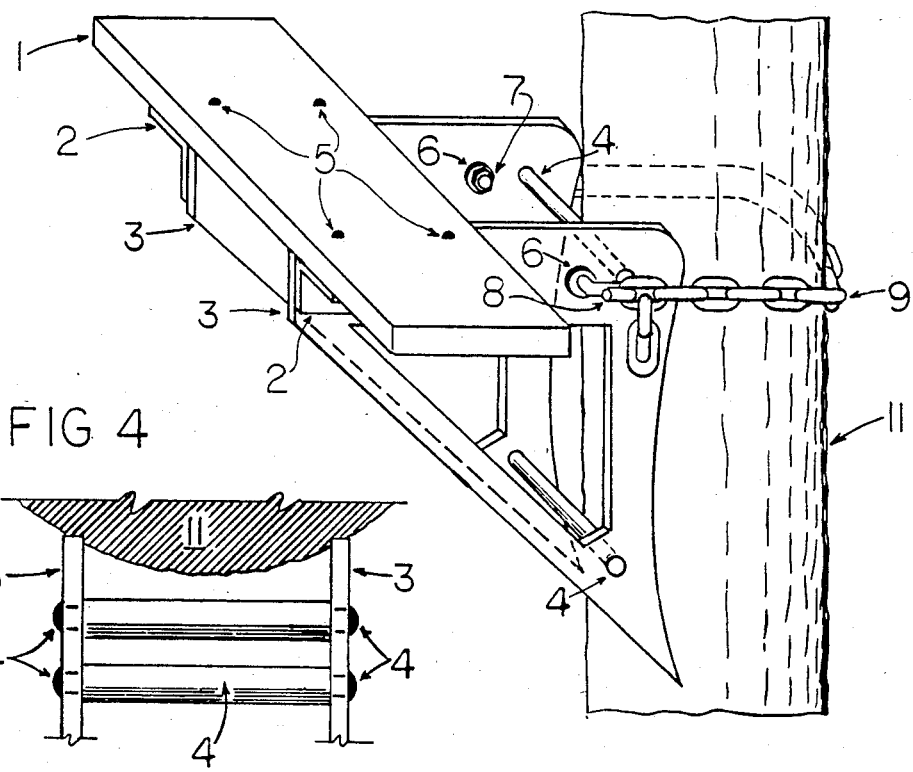
FIG 1
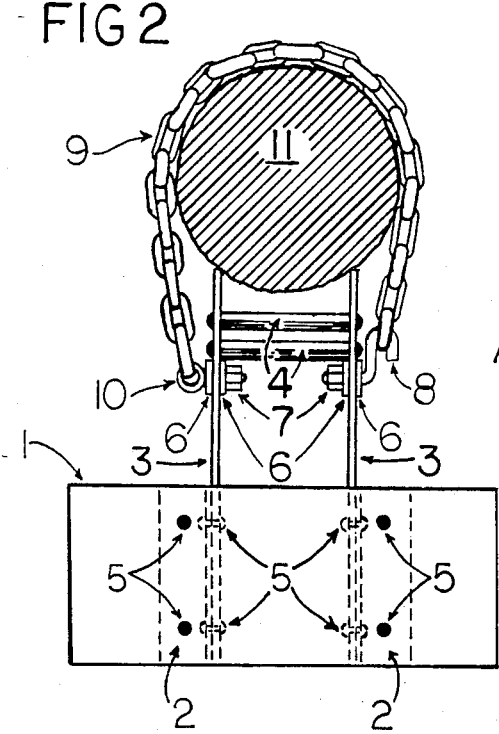
FIG 4
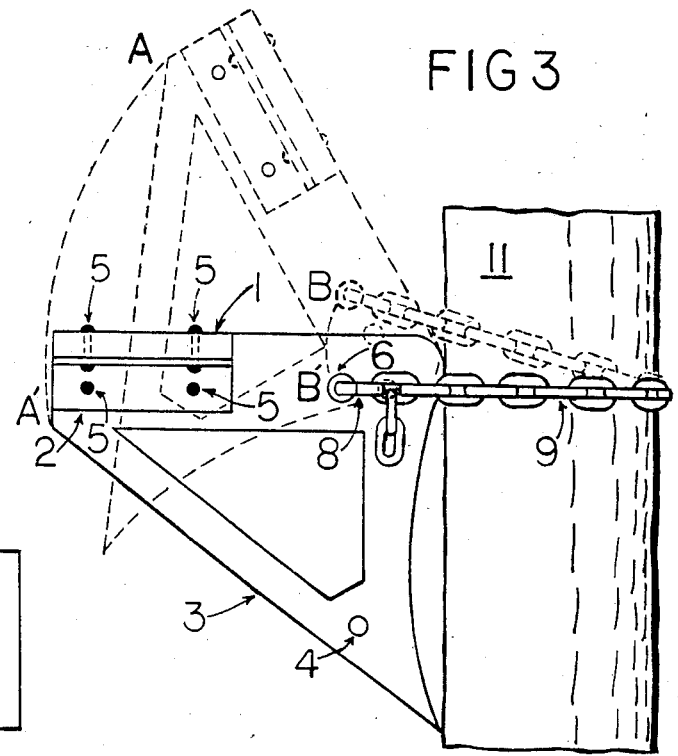
FIG 2
FIG 3

PORTABLE TREE SEAT FOR HUNTERS AND OUTDOORSMEN

FIELD OF INVENTION

This invention relates to tree seats and specifically to an improved tree seat device

DISCUSSION OF PRIOR ART

Heretofore, tree seat devices as disclosed in Prior U.S. Pat. Nos. 4,113,057 Sept. 12, 1978; 2,991,842 July 11, 1961; 3,353,629 Nov. 21, 1967; 4,113,058 Sept. 12, 1978; 3,767,011 Oct. 23, 1973; 2,858,980 Oct. 14, 1958 have not offered a singular device providing an optimum combination of performance features important to the hunter and outdoorsman. For example, some devices have provided increased weight bearing capability and stability but this was accomplished through heavier, larger and/or complex component designs while in other instances, strength, rigidity and/or design simplicity was sacrificed for convenience and portability. The versatility of the Prior Art therefore, has been principally limited to individual use and has not been readily adaptable to tree climbing type platforms such as Baker U.S. Pat. No. 3,460,649 or Bridges U.S. Pat. No. 3,991,853 as an aid-assist in climbing, and/or as a seat to be used in combination with stationary, or tree climbing platforms.

OBJECTS

Accordingly several objects of my invention are to provide an improved portable tree seat device of reduced size and weight but with a substantially increased margin of weight bearing capability and rigidity to the tree or pole. A further object of my invention is to provide a simplified structural design through the reduction of the number of specialized components in order to lower manufacturing costs. A further object of my invention is to provide enhanced versatility permitting utilization by itself as a tree seat or in combination with tree climbing platforms as an aid-assist in climbing. For example, current tree climbing platforms such as those mentioned above, require that the hunter "hug" the tree and simultaneously lift his legs to raise the platform causing a very uncomfortable and physically stressful exercise. My invention would permit the hunter to simply lean forward with arms resting upon the device and lift his legs and platform upward. Once the desired height of the tree is attained, he may turn around and sit upon the seat, precluding the necessity of standing for many hours. Due to the small size of the seat, it may also be utilized in combination with stationary or permanent type tree stands as a seat only. A further object of my invention is to provide a tree seat capable of being locked onto the tree in a 90 degree attitude so as to self maintain its own vertical and lateral integrity. A further object of my invention is to provide a tree seat device which is also capable of being utilized as a secure horizontal support for the purpose of hoisting and/or suspending heavy loads such as large game animals or food provisions above the reach of predatory animals, or to be used as a small but secure horizontal platform to support a camping stove or lantern, etc. Further objects and advantages of my invention will become apparent from the consideration of the drawings and ensuing description thereof.

DRAWINGS

Scale: 3" equals 1'0"

FIG. 1 Is a perspective view of my invention

FIG. 2 Is a plan view of FIG. 1

FIG. 3 Is a side view of perspective FIG. 1 and shows the methodology of locking the seat to a tree or wooden pole.

FIG. 4 Is an enlarged partial view of FIG. 2 detailing the interconnecting rods 4 to the tree engaging support members 3 and their engagement to the tree 11

DESCRIPTION

FIGS. 1, 2 and 3 depict three separate views of the assembled structure and individual components of my invention as well as its intended orientation to the tree or wooden pole.

My invention comprises dual generally 45 degree triangular tree engaging support plates symmetrically alligned 3 with inner cut-out sections or openings to reduce weight. The said support plates vertical leg or tree engaging front edge is rounded at the uppermost corner and extending downwardly along that same edge, concaves inwardly and then projects outwardly to a sharp point at its bottom most corner. The said support plates horizontal leg or top edge is provided a rectangular shaped cut-out section to accomodate the seat 1, and extending horizontally towards the direction of the tree, terminates at the same rounded corner described above. Said support plates may be constructed of aluminum, metal alloy or steel plate, plactic or wood and are kept parallel to, laterally separated from, and permanently connected to one another by means of the two elongated transverse interconnecting members 4 and seat 1.

FIG. 4 provides an enlarged view of the interconnecting members 4 to said support plates 3. Said interconnecting members are contructed of aluminum, steel, lightweight metal alloy or suitable plastic and are of reduced diameter at the point of ingress to the inner face of said support plates. The reduced diameter protrusion of said rod at the point of egress at the outer face of said support plate is then flatened to expand it against the outer face of said support plate. This provides a secure and permanent interconnection of both components.

Said seat 1 which may be constructed of water-proof plywood, solid lumber or plastic is permanently connected to said support plates by means of the angles 2. Said angles are adjoined to said support members and to said seat by means of rivits 5 as shown in FIGS. 1, 2, and 3 of the drawing.

The steel eyelet bolt 10 whose purpose is to secure one end of the steel chain 9 to the face of one said support plate 3 and is shown in FIG. 2 of the drawing. Said eyelet bolt is attached to and penetrates through the said support plate and is secured to that plate by means of the steel nut 7. Steel washers 6 through which said eyelet bolt passes, are provided on the interior and exterior face of the said support plate to reduce ware. The said eyelet bolt is made to freely rotate about its longitudinal axis which is accomplished by fully tightening the steel nut 7, backing off one-quarter turn and then spot welding said steel nut to said eyelet bolt end or by pinging said eyelet bolt end to prevent the said nut from loosening. The said steel eyelet bolt, steel nuts and washer are all readily available at most retail hardware stores.

The steel swivel hook 8 whose purpose is to secure the opposite end of said steel chain to the face of the opposing said support plates 3 is shown in FIGS. 1, 2, and 3 of the drawing. Said swivel hook is attached to and penetrates through said support members and is secured to that plate by means of the said steel nut. Said steel washers through which said swivel hook passes, are provided on the interior and exterior face of said support plates to reduce ware. Said swival hook is made to rotate freely about its longitudinal axis and accomplished in the exact manner as the said eyelet bolt described above. The said swivel hook is manufactured by altering a steel eyelet bolt similar to 10, and along with the said steel chain are readily available at most retail hardware stores.

OPERATION

Referring to the drawing, FIG. 3 is a side view of the operation of my invention in conjunction with a tree or wooden pole 11. The dashed line figure represents position A of the tree seat at its initial and near vertical orentation to the tree. Said chain is shown taut and encircling the opposite or back face of the tree and connected to the tree seat device at said swivel hook. From this position downward pressure is exerted on the top edge of said seat in order to force it downward along the ARC A,A' to its final horizontal attitude shown by the solid line figure at position A'. During this downward movement, the tree seat pivots against the tree at the two tree engaging rounded edges of said support plates 3, and said swival hook and eyelet bolt rotate so as to mantain an attitude corresponding to said chain at all points along the ARC B,B'. Since the same force that is exerted along ARC A,A,' is also exerted along the smaller ARC B,B', its intensity is greatly magnified to said chain, swivel hook and eyelet bolt. This causes the tree seat to be drawn very tightly against the tree and locked thereunto as the tree seats attitudinal position reaches A'. At this position, the two lower pointed projections of said support plates engage the tree, preventing any further downward movement, or lower lateral movement. From the detailed description and drawing contained herein, and with the knowledge of the art, one will deduce that the very high degree of stability and strength of this invention is attributable to the said tree engaging support plates 3 which engage the tree and become locked thereunto at four distinct locations, exclusive of the chain. The tree seat device is removed from the tree by simply lifting up on said seat and disengaging said chain from said swivel hook. While the above description contains many specificities, these should not be construed as limitations on the scope of my invention, but rather as an exemplification of one preferred embodiment thereof. Many other varations are possible, for example: the entire tree seat device may be proportionally enlarged or reduced in size; the surface area and overall configuration of the seat 1 may be revised, reduced or enlarged; a pully may be attached to the bottom face of the seat 1 as an optional feature to assist in hoisting; if aluminum plate or non-metalic materials are used in the construction of the tree engaging support plates 3, steel reinforcement tips may be added to the lower inner or outer face of the pointed projections of said support plates; all-thread steel or aluminum rods and nuts may be substituted for the said transverse interconnecting members, or welds may be utilized in fastening the said transverse interconnecting members to the interior faces of the said support plates; welds may also be substituted for rivets in fastening the angles 2 to the tree engaging support plates 3. Accordingly, the scope of the invention should be determined not by the embodiment illustrated, but by the appended claims and their legal equivalents.

I claim:

1. A portable seat and climbing device to be utilized in conjunction with an upright wooden structure such as a tree or pole as a means for providing a secure horizontal platform or seat, or in combination with tree climbing platforms as an aid-assist in climbing, or as a stationary seat to be utilized in combination with permanently affixed or portable static type tree platforms and includes: dual generally 45 degree triangular tree engaging support plates, symmetrically alligned structurally adjoined and laterally spaced by means of a cross interconnected horizontally extending seat and two elongated non-structure engaging transverse interconnecting members, the vertical leg edge surfaces of said tree engaging support plates being vertically disposed to said upright wooden structure and merging upwardly into rounded fulcrum surfaces to outwardly extending horizontal leg surfaces and said interconnected seat; integral angulating leg surfaces downwardly inclined toward said structure and adjoining said horizontal and vertical leg surface extremities; an in-elastic laterally disposed extended structure engaging means such as a chain for encircling said structure and fastening said tree seat device to said structure; the said tree engaging support plates each having an opposing and outwardly protruding connection means for attaching said extended structure engaging means selectively and releasibly to the exterior face of one said support plates' horizontal legs outer surface and permanently attaching the opposite end of said engaging means to the exterior face of the opposing said support plates horizontal legs' outer surface; said interconnecting means and said extended structure engaging means lying along the same horizontal plane at a level below the upper surface of said seat and the top edge surfaces of said support plates' horizontal legs.

2. The said tree engaging support plates of claim 1 which may be constructed of aluminum, steel, lightweight metal alloy, wood, or suitable plastic and whose said dual rounded fulcrum edge surfaces tandomly engage said structure and coacting with said connection means imparts tensioning to said extended structure engaging means as said seat device is rotated approximately 90 degrees downwardly from an initial vertical position to a secured horizontal attitude; the said horizontal leg surfaces of said tree engaging support plates whose outer extremities and top edges contain rectangular shaped openings and laterally extending protrusions eminating outwardly from the lower horizontal edges of said openings providing a means for receiving, supporting and permanently adjoining said seat, to said support plates as a means for providing an unbroken horizontal surface to the tree for supporting heavy and/or bulky items and for grasping, leaning, or sitting upon, the curved dual pointed projections at the lower extremities of said support plates' vertical legs which embed into said structure and coacting with said rounded fulcrum edge surfaces provides a tightly bound self sustaining engagement to said structure preventing lateral or vertical movement of said seat device.

3. The two said laterally protruding connection means of claim 1 being located behind and below the circular center of said support plates rounded fulcrum surfaces as a means for providing eccentric tensioning force to said structure engaging means and which are made to freely rotate about their longitudinal axes as a means to reduce friction ware between said connection means and said extended structure engaging means; reduce resistance to the initial downward positioning of the said seat device and to facilitate the selective interconnection of said selective interconnecting means to said extended structure engaging means.

* * * * *